H. D. SEVERANCE.
FISH CUTTING AND CLEANING MACHINE.
APPLICATION FILED DEC. 27, 1920.

1,403,269. Patented Jan. 10, 1922.
3 SHEETS—SHEET 1.

INVENTOR
HOWARD D. SEVERANCE
BY
ATTORNEY

H. D. SEVERANCE.
FISH CUTTING AND CLEANING MACHINE.
APPLICATION FILED DEC. 27, 1920.

1,403,269.

Patented Jan. 10, 1922.
3 SHEETS—SHEET 3.

INVENTOR
HOWARD D. SEVERANCE
BY Chas. E. Townsend.
ATTORNEY

UNITED STATES PATENT OFFICE.

HOWARD DANIEL SEVERANCE, OF MONTEREY, CALIFORNIA.

FISH CUTTING AND CLEANING MACHINE.

1,403,269.   Specification of Letters Patent.   Patented Jan. 10, 1922.

Application filed December 27, 1920. Serial No. 433,117.

*To all whom it may concern:*

Be it known that I, HOWARD DANIEL SEVERANCE, a citizen of the United States, residing at Monterey, in the county of Monterey and State of California, have invented new and useful Improvements in Fish Cutting and Cleaning Machines, of which the following is a specification.

This invention relates to fish cutting and cleaning machines and has for its object to simplify and improve the construction and operation of machines of this class.

In prior devices, so far as I am aware, it has been necessary first to slit or cut the fish into longitudinal halves and thereafter to remove the entrails by means of a wheel or disc equipped with teeth or fingers. In the present invention I make use of a different principle wherein the head of the fish is sheared or broken off in such a way as not to break or sever the entrails whereby the latter may be drawn out with the head. This makes it unnecessary to slit the fish longitudinally as in prior devices. I also make use of mechanical means for causing the fish to be arranged so that the heads will come in the proper position to be acted upon by the shearing device.

One form which my invention may assume is exemplified in the following description and illustrated in the accompanying drawings, in which—

Figure 1:
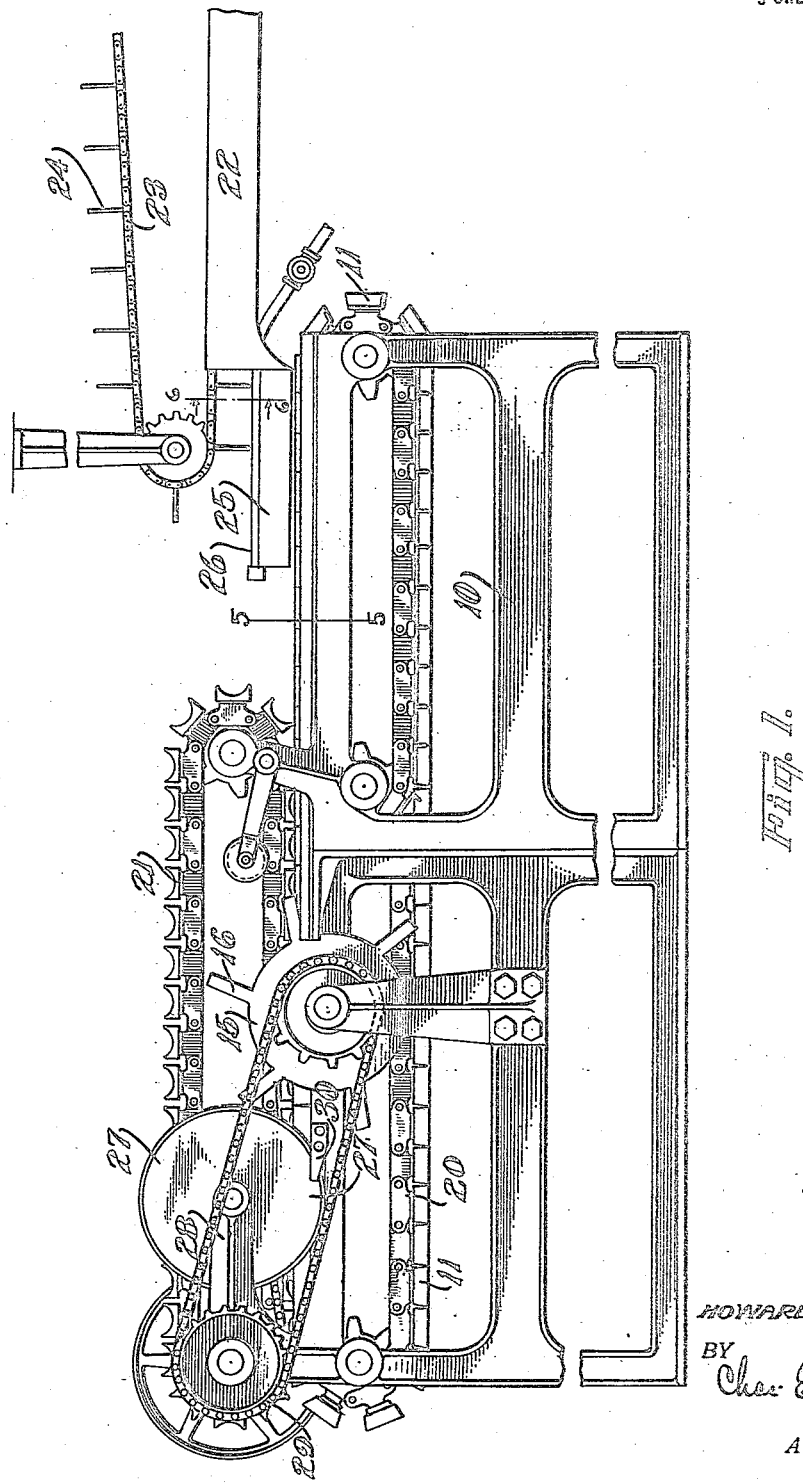
Fig. 1 shows a side elevation of a device embodying my invention.
Figure 2:
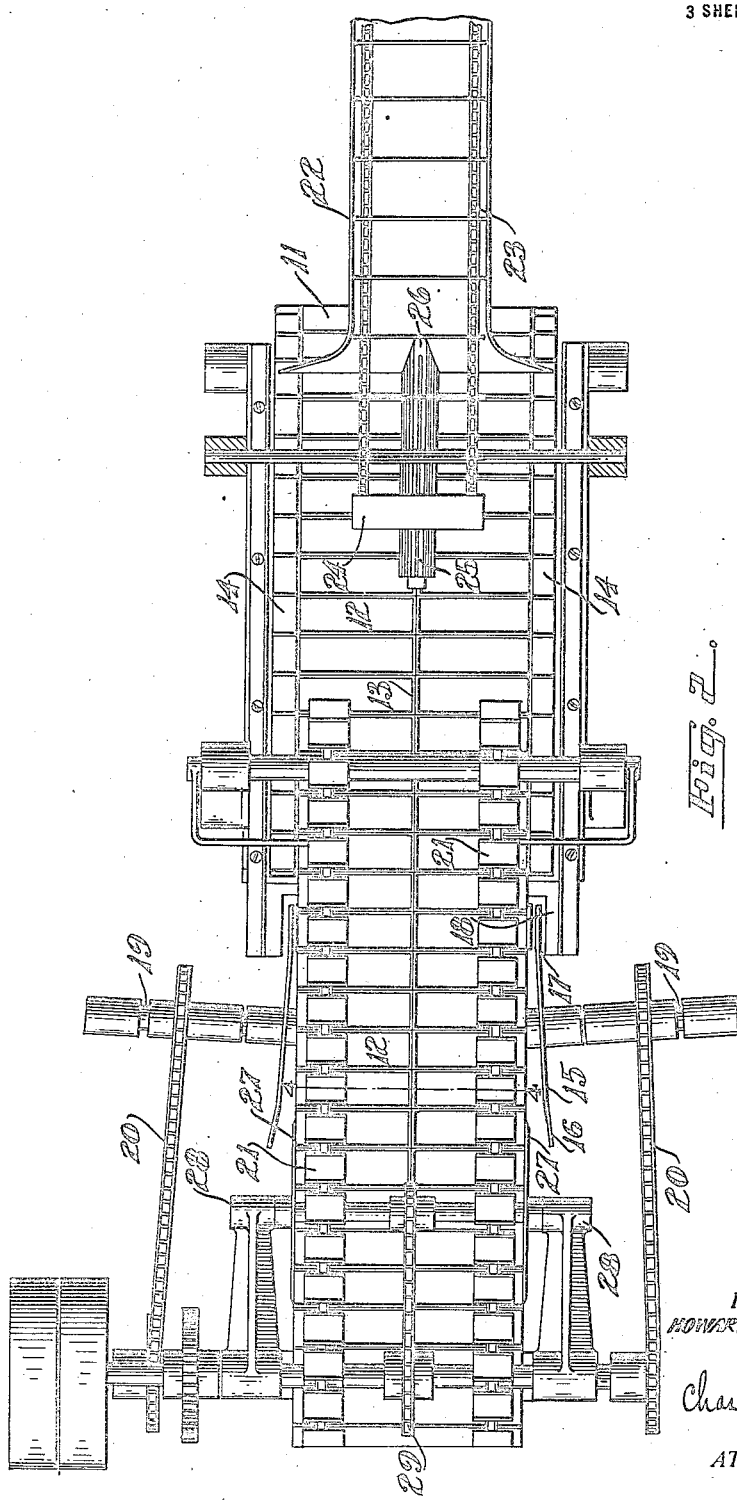
Fig. 2 shows a plan view of the same.
Figure 3:
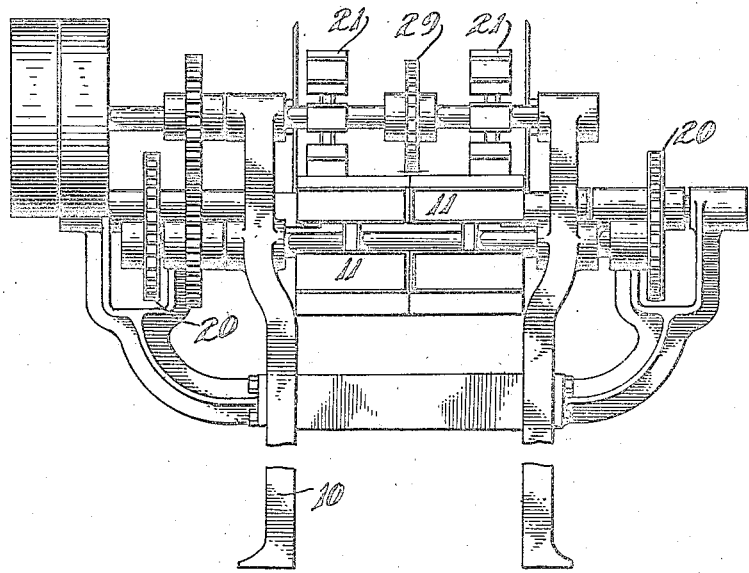
Fig. 3 shows an end elevation.
Figure 4:
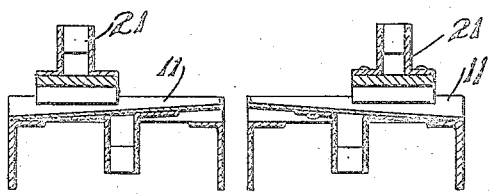
Fig. 4 shows a sectional view on the line 4—4 of Fig. 2.
Figure 5:
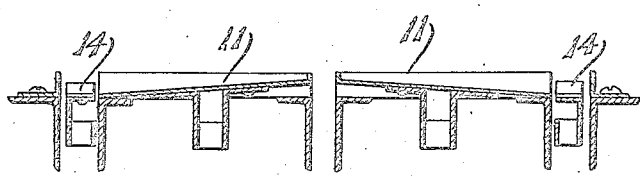
Fig. 5 shows a sectional view on the line 5—5 of Fig. 1.
Figure 6:
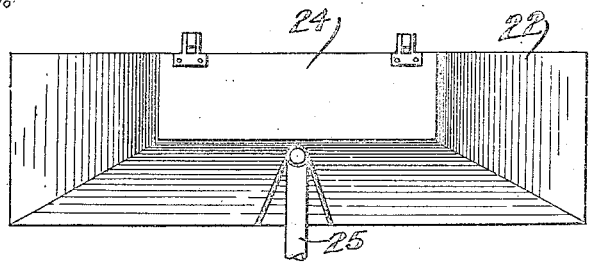
Fig. 6 shows a sectional view on the line 6—6 of Fig. 1.

The present form of machine comprises a frame 10 fitted with a longitudinal conveyor 11. This conveyor is preferably formed with transverse grooves or channels 12 to receive the fish, and it may be made double width to carry two rows of fish, there being a dividing blade 13 extending centrally and longitudinally at the top of the conveyor.

Each half of the conveyor 11 is so constructed that the head projects beyond the outside edge, and here I preferably arrange a narrow supplemental conveyor or support 14 extending from the feed end of the conveyor to a point midway the length thereof. At the latter point I arrange the shear device which in its present form consists of a disc or wheel 15 having radial fingers or toothed blades 16 movable through a widened slot 17 formed in a ledger plate 18 at the end of the run of each supplemental conveyor 14. The wheels or discs are preferably journalled on obliquely arranged axles 19 and driven by chains 20 which connect with one of the conveyor shafts.

In order to retain the fish upon the conveyor at the time the fingers or blades strike the heads I arrange an overhead conveyor 21, one for each row of pockets in the main conveyor and traveling at the same speed as the main conveyor. Each overhead conveyor has channels or pockets to co-act with the channels or pockets in the main conveyor so that the body of the fish will be securely held between.

Since the heads of the fish are required to be disposed outwardly I provide mechanical means to accomplish this, such means in the present form of the invention comprising a feed chute 22 cooperating with which is an endless conveyor 23 having transverse slats 24 to move the fish along the chute. At the discharge end of the chute is a central division plate 25 upon which the fish ride and fall to one side or the other depending on which way the heads are disposed. The greater weight of the head portion of the fish will produce this action. To assist in tumbling the fish off the division plate I preferably provide a water pipe 26 along the top thereof and arrange to project a vertical sheet of water against the fish.

In the operation of the device the fish may be fed into the feed chute in a haphazard way. The conveyor slats will cause the fish to be arranged transversely and the division plate will direct them to that side of the main conveyor where the head of the fish will be disposed outwardly. Upon reaching the shearing device the fish will be securely held between the upper and lower conveyors with the head projecting beyond the outer edges thereof and resting on the ledger plate 18. A finger or knife now strikes the head and by force of the blow causes the head to be sheared off without severing the entrails, the latter remaining with the head and leaving the body of the fish in the pocket between the upper and lower containers.

In this connection it is important to make use of dull blades or fingers 16, whose action will be to tear the head off rather than cut it. For this reason there is no danger of severing the entrails. The line of cleavage being more or less irregular, on account of the tearing action of the fingers, the trimming disk 27 plays an important part by giving the proper finish or trim to the decapitated body.

The line of severance of the head of the fish will not ordinarily be a clean straight line, on account of the peculiar action of the shearing device, and therefore it may be desirable to provide supplemental means to trim the fish so as to produce a straight line after the head and entrails have been removed. Such a trimming device is shown at 27 where I have provided a sharp disc journalled in a bracket 28 and driven by a chain 29 from one of the conveyor shafts. The edge of this disc cooperates with a shear plate 30 fixed upon the frame of the machine.

The machine herein described and illustrated is susceptible of many modifications and changes and the present structure is to be understood merely as illustrative of my invention, the principal feature of which is the shearing off of the head of the fish in such a way as to cause the entrails to be withdrawn from the body of the fish.

Having thus described my invention, what I claim and desire to secure by Letters Patent is—

1. In a machine of the class described, conveying means provided with a series of pockets, each to receive the body of a fish with the head projecting therefrom, means to clamp the fish in place in the pockets and a rotatable device having a dull finger positioned to strike a downward blow to the projecting heads, whereby to tear the same from the body without severing the entrails.

2. In a machine of the class described, conveying means provided with a series of pockets, each to receive the body of a fish with the head projecting therefrom, means to clamp the fish in place within the pockets, a rotatable device having a dull finger arranged in position to strike a downward blow to the projecting heads of the fish, and a ledger plate on which the heads rest when the finger becomes operative whereby the head of the fish is torn from the body, bringing with it the entrails.

3. In a machine of the class described, conveying means provided with a series of pockets, each to receive and retain the body of a fish with the head projecting therefrom, a rotatable device having a dull finger arranged in position to strike a downward blow to the projecting heads of the fish whereby the heads are torn from the body bringing with them the entrails, and a comparatively sharp rotatable disk arranged in position to trim the decapitated body.

4. In a machine of the class described, a main conveyor having transverse pockets, each to receive a fish, a partition extending centrally and longitudinally of the conveyor to separate the pockets into two rows, means for delivering fish to said conveyor, a central division plate at the discharge end of the delivery means, on which the fish ride so that they will fall into one row of pockets or the other, depending upon which direction the head is disposed, and hydraulic means in connection with said division plate to assist in the tumbling action of the fish.

5. In a machine of the class described a main conveyor having transverse pockets, a partition extending centrally and longitudinally of the conveyor to separate the pockets into two rows, means for delivering fish to said conveyor in a single row, a central division plate at the discharge end of the delivery means on which the fish ride so that the latter will fall into one row of pockets or the other depending upon which direction the head is disposed, said pockets being so constructed that the heads will project to one side thereof, and means disposed in the path of the projecting heads to sever the latter.

6. In a machine of the class described a main conveyor having transverse pockets, a partition extending centrally and longitudinally of the conveyor to separate the pockets into two rows, means for delivering fish to said conveyor in a single row, a central division plate at the discharge end of the delivery means on which the fish ride so that the latter will fall into one row of pockets or the other depending upon which direction the head is disposed, said pockets being constructed so that the heads will project to one side thereof, and an overhead conveyor co-operating with each row of pockets to clamp the fish between, to retain the body of the fish in the latter and means disposed in the path of the projecting heads to sever the latter.

HOWARD DANIEL SEVERANCE.